(12) United States Patent
Hendrickson et al.

(10) Patent No.: US 6,745,011 B1
(45) Date of Patent: Jun. 1, 2004

(54) SYSTEM AND METHOD FOR MEASURING WIRELESS DEVICE AND NETWORK USAGE AND PERFORMANCE METRICS

(75) Inventors: Keith Hendrickson, Carlsbad, CA (US); William Maguy, San Francisco, CA (US); Paul Prehn, Walnut Creek, CA (US); Nick Stamos, San Francisco, CA (US); Annie Su, San Francisco, CA (US)

(73) Assignee: Telephia, Inc., San Francisco, CA (US)

( * ) Notice: Subject to any disclaimer, the term of this patent is extended or adjusted under 35 U.S.C. 154(b) by 424 days.

(21) Appl. No.: 09/654,486

(22) Filed: Sep. 1, 2000

(51) Int. Cl.⁷ .............................................. H04B 17/00
(52) U.S. Cl. ..................... 455/67.11; 455/405; 455/423
(58) Field of Search .......................... 455/2.01, 67.11, 455/423, 424, 425, 67.13, 67.7, 405; 709/224

(56) References Cited

U.S. PATENT DOCUMENTS

| | | | |
|---|---|---|---|
| 4,361,851 A | 11/1982 | Asip et al. | |
| 5,675,510 A | 10/1997 | Coffey et al. | |
| 5,796,952 A | 8/1998 | Davis et al. | |
| 5,872,588 A | 2/1999 | Aras et al. | |
| 5,987,306 A | * 11/1999 | Nilsen et al. | ............ 455/67.11 |
| 5,991,735 A | 11/1999 | Gerace | |
| 6,115,680 A | 9/2000 | Coffee et al. | |
| 6,138,147 A | 10/2000 | Weaver et al. | |
| 6,397,256 B1 | * 5/2002 | Chan et al. | .................. 709/229 |
| 6,405,245 B1 | 6/2002 | Burson et al. | |
| 6,405,251 B1 | * 6/2002 | Bullard et al. | .............. 709/224 |
| 6,470,386 B1 | * 10/2002 | Combar et al. | ............. 709/224 |
| 2002/0025795 A1 | * 2/2002 | Sharon et al. | ............... 455/405 |

FOREIGN PATENT DOCUMENTS

| | | |
|---|---|---|
| EP | 0849 909 A2 | 6/1998 |
| WO | WO 98/26541 | 6/1998 |

OTHER PUBLICATIONS

D. M. Hilbert et al., "An Approach to Large–Scale Collection of Application Usage Data Over the Internet", IEEE, 1998, pp. 136–145.

* cited by examiner

Primary Examiner—Quochien B. Vuong
(74) Attorney, Agent, or Firm—Morrison & Foerster LLP

(57) ABSTRACT

Systems and methods for measuring wireless device and wireless network usage and performance metrics are set forth. The system includes at least one wireless device, and data gathering software installed on the wireless device for collecting device parametric data, network parametric data, event data. A control center may receive, store and process said device parametric data, network parametric data, and event data.

84 Claims, 18 Drawing Sheets

Fig. 3a

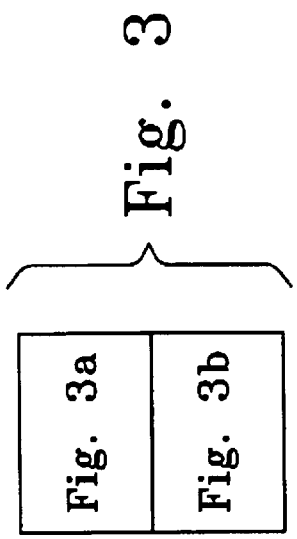

Fig. 3

| Origination Point | Channel | Message Title | Message Content |
|---|---|---|---|
| Base Station | Access | Overhead Information Substrate | General Page Messages |
| Base Station | Access | Overhead Information Substrate | Page Messages |
| Base Station | Access | Overhead Information Substrate | Slotted Page Messages |
| Handset | Access | Mobile Station Order/Message Response Substrate | Received Messages Order Acknowledgement/Response |
| Handset/Base station | Access | Registration Substrate | Authentication Challenge Message |
| Handset/Base station | Access | Registration Substrate | Base Station Challenge Confirmation Order |

| Origination Point | Channel | Message Title | Message Content |
|---|---|---|---|
| Handset/Base station | Paging | Paging Channel Substrate | Any Message |
| Handset/Base station | Paging | Paging Channel Substrate | Abbreviated Alert Order |
| Handset/Base station | Paging | Paging Channel Substrate | Audit Order |
| Handset/Base station | Paging | Paging Channel Substrate | Authentication Challenge Message |
| Handset/Base station | Paging | Paging Channel Substrate | Base Station Acknowledgement Order |
| Handset/Base station | Paging | Paging Channel Substrate | Base Station Challenge Confirmation Order |
| Handset/Base station | Paging | Paging Channel Substrate | Channel Assignment Message |
| Handset/Base station | Paging | Paging Channel Substrate | Data Burst Message |

| Origination Point | Channel | Message Title | Message Content |
|---|---|---|---|
| Base station | Forward Link | Forward Channel Substrate | Systems Parameters Messages |
| Base station | Forward Link | Forward Channel Substrate | Access Parameters Message |
| Base station | Forward Link | Forward Channel Substrate | Neighbor List Message |
| Base station | Forward Link | Forward Channel Substrate | CDMA Channel List Message |
| Base station | Forward Link | Forward Channel Substrate | Extended System Parameters Message |
| Base station | Forward Link | Forward Channel Substrate | Global Service Redirection Message |
| Base station | Forward Link | Forward Channel Substrate | Abbreviated Alert Order |
| Base station | Forward Link | Forward Channel Substrate | Audit Order |

| Origination Point | Channel | Message Title | Message Content |
|---|---|---|---|
| Handset | Reverse Link | Reverse Channel Substrate | Systems Parameters Messages |
| Handset | Reverse Link | Reverse Channel Substrate | Access Parameters Message |
| Handset | Reverse Link | Reverse Channel Substrate | Neighbor List Message |
| Handset | Reverse Link | Reverse Channel Substrate | CDMA Channel List Message |
| Handset | Reverse Link | Reverse Channel Substrate | Extended System Parameters Message |
| Handset | Reverse Link | Reverse Channel Substrate | Global Service Redirection Message |
| Handset | Reverse Link | Reverse Channel Substrate | Abbreviated Alert Order |
| Handset | Reverse Link | Reverse Channel Substrate | Audit Order |

Fig. 3b

| Item | Definition |
|---|---|
| min1_accolc | access overload class for each MIN in the given NAM |
| air_timer | air timer for the given NAM |
| analog_first_chp | first analog channel given for that NAM |
| analog_hone_sid | analog home system ID for the given NAM |
| analog_pref_serv | analog preferred service system |
| analog_reg | analog_registration setting |
| analog_sid_acq | analog SID acquistion list |
| analog_sid_lock | analog SID lockout list |
| auto_answer | auto answer setting |
| auto_hyphen | auto hyphen setting |
| auto_lock | auto lock setting |
| auto_mute | auto radio mute setting |
| auto_nam | auto select NAM |
| auto_power | auto power off |
| auto_redial | auto redial setting |
| a_key | authentication key |
| a_key_chksum | authentication check sum |
| back_light | back light |
| banner | current banner |
| beep_lvl | key beep volume level |
| call_fade_alert | call fade alert select |
| call_rest | call restrictions |
| call_timer | last call time for a given NAM |
| cdma_pn_mask | short code pn offset mask choice |
| cdma_pref_serv | cdma pref serv |
| cdma_rx_pwr | CDMA receive power |
| cdma_tx_pwr | CDMA transmit power |
| cdma_sid_acq | cdma sid acquisition list for a given NAM |
| data_idle_timeout | data service idle time in seconds |
| data_io_mode | external data port mode |
| data_srvc_state | data service enabled/disabled |
| dist_reg | distance based registration values |
| ear_lvl | handset earpiece volume level |
| err_log | adds entry to the on board error log |
| esn | electronic serial number |
| esn_chksum | checksum for the electronic serial number |
| fm_rssi | FM relative signal strength |
| fm_tx_pwr | FM transmit power |
| fr_temp_offset | frequent offset temp values |
| life_timer | lifetime {non-resetable} cumulative call timer |
| locaid | analog location area ID |
| lstsid | last SID registered |
| ppcnch | primary PCN channel for the given NAM |
| pref_mode | mode preference |
| pureg | analog power up registration identifier |

| Basic Phone Functions | | |
|---|---|---|
| Event Type | Metrics → | MSM Location → |
| Power Up | TD-LL (Time, Date, Long-Lat) | GPIB Interface<br>GPS Processor |
| Power Down | TD-LL | GPIB Interface<br>GPS Processor |
| Phone Mode – Acquisition | TD-LL<br>Roaming Indicator<br>*Acq state can interleave between any state | Mode Select Interface<br>Phase Lock Loop<br>RF Interface<br>CDMA Processor<br>GPS Processor |
| Phone Mode – Dig 800 | TD-LL | Mode Select Interface<br>Phase Lock Loop<br>RF Interface<br>CDMA Processor<br>GPS Processor |

510 520 530

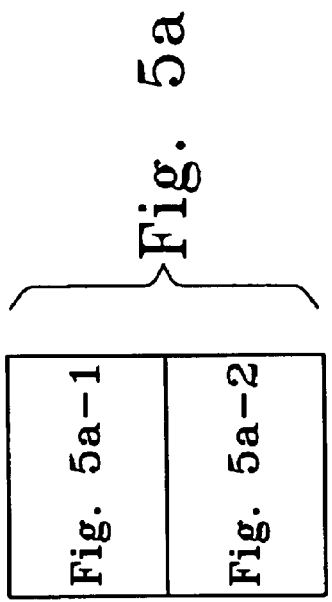

Fig. 5a

| Fig. 5a-1 |
| Fig. 5a-2 |

*Mode Select Interface<br>Most Recently Used (MRU)<br>Acquisition Table<br>System Table

| | | |
|---|---|---|
| Phone Mode – Dig 1.9G | TD-LL | Mode Select Interface<br>Phase Lock Loop<br>RF Interface<br>CDMA Processor<br>GPS Processor |
| Phone Mode – Analog | TD-LL | Mode Select Interface<br>Phase Lock Loop<br>RF Interface<br>CDMA Processor<br>GPS Processor |
| Phone Mode – No Service | TD-LL | Mode Select Interface<br>Phase Lock Loop<br>RF Interface<br>CDMA Processor<br>GPS Processor |
| External Power Applied | TD-LL<br>Voltage<br>Temp Battery<br>Charge State | Charging System<br>GPS Processor |
| External Power Applied – Charging Complete | TD-LL<br>Voltage<br>Temp Battery<br>Charge State | Charging System<br>GPS Processor |
| External Power Removed | TD-LL<br>Voltage<br>Temp Battery | Charging System<br>GPS Processor |

| Fig. 5b-1 |
|---|
| Fig. 5b-2 |

} Fig. 5b

Voice Call Events

| Event Type | Metrics | MSM Location |
|---|---|---|
| Land-side Voice Call | TD-LL | CDMA Processor<br>GPS Processor |
| Land-side Voice Call Connect | TD-LL<br>Vocoder (8, 13, 8EVRC)<br>Transmit Power (Tx)<br>Receive Power (Rx)<br>Frame Errasure Rate (FER) | CDMA Processor<br>GPS Processor |
| Land-side Voice Call Blocked | TD-LL | CDMA Processor<br>GPS Processor |
| Land-side Voice Call End | TD-LL<br>Mobile Terminated<br>Land-side Terminated<br>Dropped | CDMA Processor<br>GPS Processor |
| Mobile Voice Call Origination | TD-LL<br>MIN Dialed | CDMA Processor<br>GPS Processor |

| | | |
|---|---|---|
| Mobile Voice Call Connect | TD-LL<br>MIN Dialed<br>Vocoder (8, 13, 8EVRC)<br>Transmit Power (Tx)<br>Receive Power (Rx)<br>Frame Errasure Rate (FER) | CDMA Processor<br>GPS Processor |
| Mobile Voice Call Blocked | TD-LL<br>MIN Dialed | CDMA Processor<br>GPS Processor |
| Mobile Voice Call End | TD-LL<br>Mobile Terminated<br>Land-side Terminated<br>Dropped | CDMA Processor<br>GPS Processor |

M-Advertising

| Event Type | Metrics | MSM Location |
|---|---|---|
| Ad Displayed | TD-LL<br>UPID<br>Ad ID | Browser<br>GPS Processor |
| Ad Selected | TD-LL<br>UPID<br>Ad ID | Browser<br>GPS Processor |

Fig. 5b-2

Browser Call Events

| Event Type | Metrics | MSM Location | |
|---|---|---|---|
| Mobile Browser Launch | TD-LL | Browser<br>GPS Processor | |
| Mobile Browser Call Origination | TD-LL | Browser<br>GPS Processor | |
| Mobile Browser Call Connect | TD-LL<br>Transmit Power (Tx)<br>Receive Power (Rx)<br>UPID (unique page identifier –<br>IP, URL, Card ID)<br>Deck Byte Size | Browser<br>GPS Processor | |
| Mobile Browser Call Blocked | TD-LL | Browser<br>GPS Processor | |
| Deck (URL) Request –<br>Operator Server (inside portal) | TD-LL<br>UPID | Browser<br>GPS Processor | |
| Deck (URL) Request –<br>External Server (outside portal) | TD-LL<br>UPID | Browser<br>GPS Processor | |
| Deck (URL) Received –<br>Success | TD-LL<br>UPID<br>Deck Byte Size | Browser<br>GPS Processor | |
| Deck (URL) Received –<br>Error | TD-LL<br>UPID | Browser<br>GPS Processor | |
| Card Select | TD-LL<br>UPID | Browser<br>GPS Processor | |
| Mobile Browser Call Termination | TD-LL<br>Mobile Termination<br>Dropped | Browser<br>CDMA Processor<br>GPS Processor | |

Fig. 5c

| M-Commerce | | | |
|---|---|---|---|
| Event Type | Metrics | | |
| Product Selection | TD-LL<br>UPID<br>UPC (or equivalent)<br>Price | Browser<br>GPS Processor | |
| Purchase Confirmation | TD-LL<br>UPID | Browser<br>GPS Processor | |

| SMS Messaging | | | |
|---|---|---|---|
| Event Type | Metrics | | |
| SMS Message Received | TD-LL<br>Byte Size | MSM Location<br>CDMA Processor<br>GPS Processor | |
| SMS Message Sent | TD-LL<br>Byte Size | CDMA Processor<br>GPS Processor | |

Fig. 5d

Data and Voice {example}

(1) ⟵710

06/20/2000 23:20:00.450 [15] ACCESS CAI
Origination Message
ack_seq 7, msg_seq 7, ack_req
1, valid_ack 0, ack_type 0
esn 0xB334C545
imsi {0,0}
imsi_s=1308392c2=(415) 637-4817
auth_mode 0
mob_term 1
slot_cycle_index 2
mob_p_rev 1
scm 0xa0
request_mode 3
special_service 0 ⟵730
*{0=data, 1=voice}*
service_option 0x8000
digit_mode 0
more_fields 0
num_fields 7
chari[ ]: 2641797

(2) ⟵720

06/20/2000 23:21:00.000 [15] ACCESS CAI
Origination Message
ack_seq 7, msg_seq 7, ack_req
1, valid_ack 0, ack_type 0
esn 0xB334C545
imsi {0,0}
imsi_s=1308392c2=(415) 637-4817
auth_mode 0
mob_term 1
slot_cycle_index 2
mob_p_rev 1
scm 0xa0
request_mode 3
special_service 1 ⟵730
*{0=data, 1=voice}*
service_option 0x8000
digit_mode 0
more_fields 0
num_fields 7
chari[ ]: 2641797

Fig. 7

Site Measurements

General Summary Statistics

| Site | Number of Unique Visitors | Total Number of Hits | % Reach | % Reach by Carrier | | | | |
|---|---|---|---|---|---|---|---|---|
| | | | | Carrier 1 | Carrier 2 | Carrier 3 | Carrier 4 | Carrier 5 |
| yahoo.com | 709 | 1,575 | 45% | 43% | 48% | 52% | 37% | 46% |
| ebay.com | 118 | 981 | 12% | 13% | 11% | 12% | 14% | 10% |
| msn.com | 35 | 315 | 11% | 11% | 13% | 9% | 10% | 12% |
| amazon.com | 14 | 200 | 7% | 6% | 7% | 7% | 7% | 8% |

Fig. 10A

Average User Profile

| | Total | Carrier 1 | Carrier 2 | Carrier 3 | Carrier 4 | Carrier 5 |
|---|---|---|---|---|---|---|
| Total Number of Data Sessions | 21 | 13 | 27 | 26 | 17 | 21 |
| Total Time of All Sessions, Minutes | 315 | 202 | 410 | 394 | 261 | 312 |
| Average Time per Session, Minutes | 15 | 10 | 20 | 19 | 12 | 15 |
| Total Number of Unique Sites Visited | 84 | 54 | 109 | 105 | 70 | 83 |
| Average Number of Unique Sites Visited per Session | 4 | 3 | 5 | 5 | 3 | 4 |
| Average Time Spent per Site Minutes | 4 | 2 | 5 | 5 | 3 | 4 |

Fig. 10B

SYSTEM AND METHOD FOR MEASURING WIRELESS DEVICE AND NETWORK USAGE AND PERFORMANCE METRICS

BACKGROUND OF THE INVENTION

1. Field of the Invention

This invention relates generally to wireless devices and networks, and in particular, to systems and related methods for measuring wireless device and wireless network usage and performance metrics.

2. Description of the Related Art

Traditionally, consumers have used wireless devices for basic telephony with limited use of basic one-way text messaging features and enterprise based data applications. The recent growth in the wireless industry along with the popularity of the internet has led to a natural convergence of the two. This new combined communications application and set of services including applications such as wireless web microbrowsing, web clipping applications, one-way and two-way text messaging, are commonly referred to in the industry as wireless data, wireless internet, or wireless web services: Mobile telephone handsets, pagers, and personal digital assistants (PDAs), for example, all now have wireless data capabilities and are commonly referred to in the industry as wireless devices.

Wireless data is an enhancement to traditional wireless services provided by cellular, PCS, SMR, and paging network operators. The Wireless Application Protocol (WAP) is a key enabler of wireless data—with wireless device users now able to browse internet sites, purchase goods and services, send and receive email, have a broad array of internet content pushed to their wireless devices, and access corporate and personal information using their wireless devices. Today in the United States carriers have rolled these wireless data services out over networks such as circuit-switched and CDPD, but these and other services will soon be provided over faster, more advanced wireless network technologies, for example High Data Rate [HDR], General Packet Radio Service [GPRS], Enhanced Data Rates for GSM Evolution [EDGE], 1XRTT, CDMA2000, and Wide-band CDMA [W-CDMA].

Wireless data industry participants such as service providers, advertisers, content providers and electronic and mobile commerce companies have a need for information on consumer activity and usage of wireless data. First, for example, there exists a need to collect information on the activity and usage behavior of wireless data users. Consumer usage, audience, and purchase information statistics are staples in most developed industries. There is a need to rapidly make these information streams available to all participants of this new and not well understood industry in order to expedite the development of more effective service and product offerings—thereby improving the satisfaction level of users, accelerating the overall growth of the industry, and saving industry participants time and money by avoiding uninformed strategies and initiatives. Second, for example, there is a need to make available to the wireless industry a continuous, real-time set of independent and unbiased network and device performance data. Not only is there a need by network operators and device manufacturers to benchmark the performance of their own networks and devices specifically as it relates to wireless data and more traditional wireless voice applications, but also there is a need to provide to sellers, advertisers, and content providers objective data on the level of service customers are receiving from wireless network and device partners. Third, for example, there is a need to integrate these information streams together, thereby providing industry participants an improved understanding of how wireless network service levels and device performance characteristics (and changes in them) impact wireless data user behavior. For instance, there is a need by electronic and mobile commerce companies to quantify "lost revenue" resulting from a failed wireless transaction due to poor network performance.

Usage, Audience, and Purchase Information

While the popularity of wireless telephony and WAP-based data services is surging, there has been no reliable system for measuring wireless data user behavior. Today, competitive marketing information on the wireless data industry is obtained primarily through consumer surveys, the accuracy of which are unreliable and often in question by the industry.

As a result, there is an acute demand for a more accurate service that monitors user activity and usage of wireless data. Wireless network operators, wireless device manufacturers, advertisers, and content providers are all looking for more accurate and detailed information to be able to better understand the behavior, experiences, and needs of wireless data users. Limited data presently exists on even the most basic of questions regarding wireless data users—the numbers and demographics of users; what wireless devices and networks they use; when, how often, for how long, and from what location they access the wireless internet; what sites they visit; what transactions they execute; what advertisements they view/redeem, etc. As the industry advances and matures and users of wireless data become more sophisticated, the ability to track user behavior over time will also become particularly important. Services exist in the wired internet and other industries that provide this type of consumer usage, audience rating, and purchase data.

Creating a system and method to effectively and accurately collect wireless data consumer usage and activity information poses a number of challenges over the wired internet industry. For instance, challenges typically confronted where wireless devices are involved include restricted memory capacity, power limitations, limited processing power, multiple proprietary operating systems with limited interfaces, and the like. Furthermore, there is a need to accommodate activity relating to different wireless network protocols, each designed according to its own specifications. Moreover, there is a need to track activity across a range of data applications and protocols including for example WAP, web clipping applications, HTML, WML, and XML browsers.

As the wireless data industry prepares for the expected flood of new wireless data users, there exists a strong market need for improved wireless data consumer usage and activity information.

Network/Device Performance Information

A strong market need exists for a system to monitor the performance of wireless data networks and wireless devices. At present, there is no industry standard for "Quality of Service" (QOS) data on the performance of wireless data networks. Currently, network operators generally conduct proprietary drive test network benchmarking activities solely for their own internal use. Network operators generally do not make this information available to external parties, such as dotcoms, internet content partners, wireless data application services providers, wireless advertisers, wireless electronic commerce companies, etc. Even if such information were made available to other industry participants outside the network operator's organization, the information would not be sufficient because of the proprietary nature and varying approaches for data collection across network operators, lack of a standard schedule for data collection, and biases resulting from rating the performance of a network provider's own network versus that of its competitors.

Consequently, there is a need for a more robust and real-time method of monitoring the data performance of wireless networks. Network operators are inexperienced in providing data services, and they are keenly interested in information that will help them understand how their networks stack up in supplying wireless data services and where, when, and how to optimize their networks. Carrier interest in objective QOS data has been further heightened by recent federal mandates for E911 service capabilities—carriers can no longer tolerate coverage gaps and prolonged problems in their service areas. Objective information on the performance of network operators is also of great interest to other wireless industry participants who are looking to focus their sales, marketing, and product development efforts on those network operators and geographies providing satisfactory levels of service to wireless data users. In the wired internet industry, existing information service companies provide non-user based, automated, real-time QOS tracking of web hosting servers and backbone networks. There now exists a need to capture performance measurements which include wireless data in addition to the traditional back-end wireline performance metrics. This type of end-to-end measurement, which includes wireless data, is a more complex process compared with the back-end measurement typified by the wired internet industry as it must include the radio link. Continuously tracking statistics concerning RSSI, channel assignments, bit error rates, transmit power, call result, etc. can benefit the wireless data industry participants and users.

Similarly, there is a need for improvement in the real-time collection of wireless device statistics. Presently, manufacturers conduct only pre-shipping device performance tests. Once in the hands of consumers, the burden ordinarily is placed solely on wireless data users to determine whether a device is not functioning correctly. This is fairly easy if the device does not turn on or is visibly broken, but more difficult when other more subtle failures or performance degradations occur. For instance, there exists a need for wireless device parametric information based on real-time user activity (which can be tracked over a period of time) on metrics such as DSP, battery life, power consumption, finger assignments, etc. Device manufacturers and network operators, for example, could use this information to identify and replace "out of spec" or malfunctioning devices, thus reducing the number of wireless data users experiencing wireless device related performance problems. Other information such as available memory, control settings, and Personal Information Management (PIM) feature utilization could also assist device manufacturers in planning future wireless device features. Overall, such a capability could lead to greater wireless data user satisfaction with network operators, wireless device manufacturers, applications companies, as well as help those parties more quickly understand device performance characteristics and address device design and manufacturing issues, in order to bring improved products and services to consumers.

Integrated Information

The breadth of information services encompassed within the invention as well as the ability to capture real-time, comprehensive marketing and performance information is distinguished from any conventional market research methods that currently exist. The unique ability to integrate these data streams adds further value to the wireless data community. For example, the invention will for the first time simultaneously collect information about user activity and network performance. By analyzing these two data streams, service providers will be able to draw meaningful insights into the effects that network performance has on the usage patterns of their customers.

There also exists an increasing need to make available to location-based advertisers information on latency and delivery failure rates of "push" notification services over competing wireless networks at specific times and in specific geographies (e.g., during a baseball game at the local ball park). Moreover, a need has developed for access to GPS location data or delivery statistics in conjunction with other metrics (e.g., consumer usage behavior, network and device performance) to make real time assessments of network operator service capabilities at specific times and locations. As current constraints on wireless device performance are overcome, constraints such as bandwidth, speed, memory, screen size, etc., there will be an increasing need for information concerning user activity and usage, wireless network performance, and wireless device performance.

SUMMARY OF THE INVENTION

The present invention encompasses systems and related methods for providing wireless device and wireless network usage and performance metrics.

A system for measuring wireless device and wireless network usage and performance metrics is set forth. The system includes a wireless device with a processor and memory, data gathering software installed on the wireless device for collecting device parametric data, network parametric data, and event data. The data gathering software may also collect location data and time stamp data. A plurality of wireless devices may be distributed to a panel of selected users.

In one embodiment of the invention, data gathering software may be composed of various modules for collecting device parametric data, network parametric data, and event data, and transmitting collected data via a wireless communication network to a control center for processing.

Another aspect of the invention sets forth a method for measuring wireless device and wireless network usage and performance metrics. The method includes collecting device parametric data, network parametric data, and event data, for example, and transmitting the collected data via a wireless communication network to one or more control centers for processing. In one embodiment of the invention, processing at a control center produces products relating to usage and activity, network performance and device performance, which may be integrated with location and time stamp data.

These and other features and advantages of the invention will be better understood from the following detailed description of a presently preferred embodiment of the invention in conjunction with the appended drawings.

BRIEF DESCRIPTION OF THE DRAWINGS

FIG. 3 sets forth sample access, paging, forward, and reverse channel messages that can be collected by the embodiment of FIG. 1.

FIG. 4 sets forth sample messages collected by a device parametric data module of the embodiment of FIG. 1.

FIGS. 5a, 5b, and 5c, and 5d set forth a sample of event type data gathered by the data gathering software of the embodiment and locations from which various metrics corresponding to event types are gathered.

FIG. 7 shows sample messaging, from a CDMA Processor of the wireless device of FIG. 6, providing a Metric of whether a call is a data call or a voice call.

FIGS. 10a and 10b show sample reports generated from data collected using the system of FIG. 1.

DETAILED DESCRIPTION OF THE PREFERRED EMBODIMENT

The present invention encompasses methods and related systems for measuring wireless device and wireless network usage and performance metrics. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
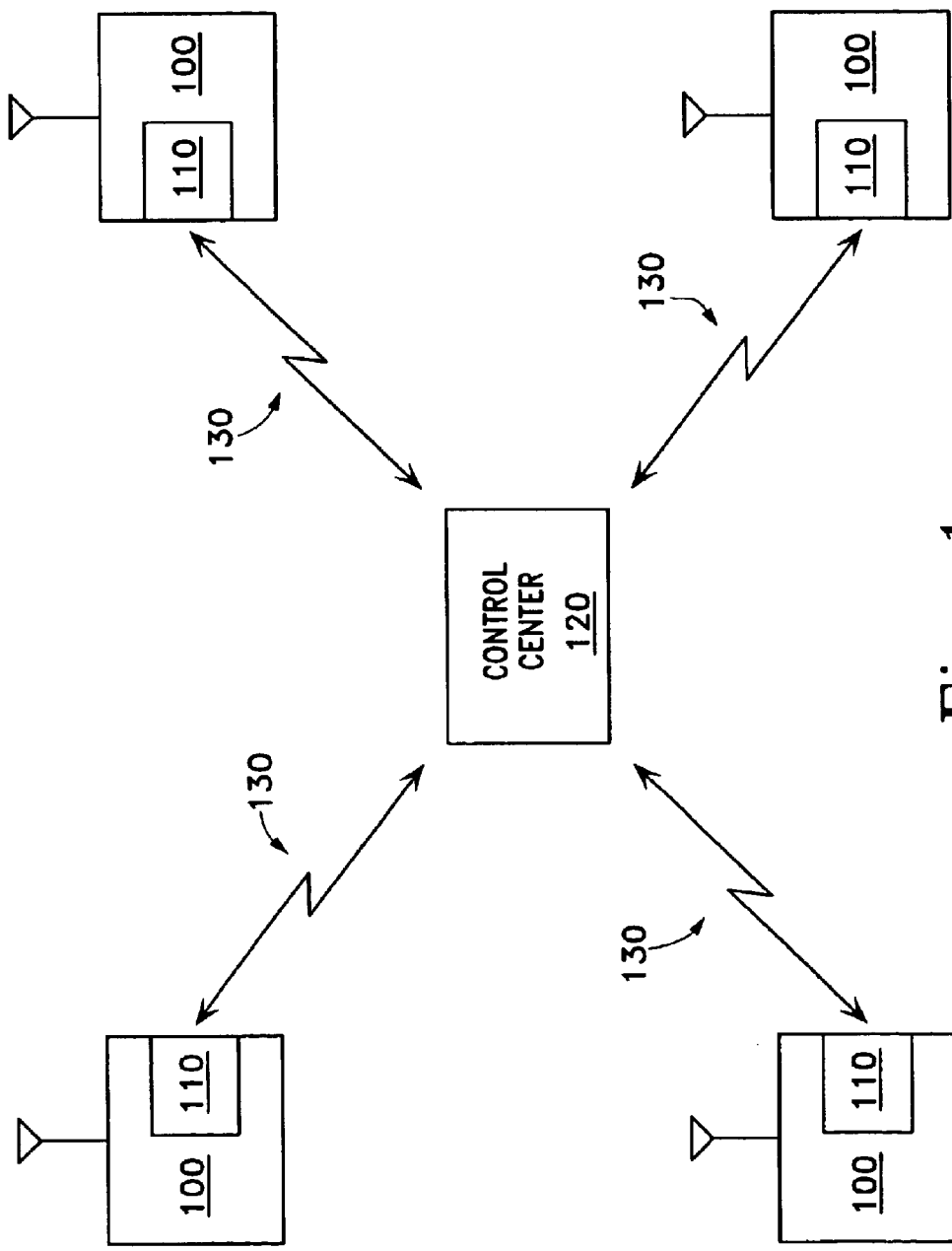
FIG. 1 shows an architecture of a presently preferred embodiment of the invention which includes a system for measuring wireless device and wireless network usage and performance metrics.

Referring to FIG. 1, there is shown an architecture of a presently preferred embodiment of the invention. The embodiment includes a system for measuring wireless device and wireless network usage and performance metrics. A plurality of wireless devices 100 are shown with data gathering software 110 installed on each wireless device 100. Data gathered by the data gathering software 110 is transmitted via a wireless link 130 to a control center 120.

The system set forth in FIG. 1 measures the usage and performance of a variety of wireless networks and devices by a variety of users. Wireless devices 100 include, but are not limited to, mobile telephone handsets, pagers, and personal digital assistants (PDAs). Wireless networks on which wireless devices 100 operate and from which data is gathered according to the preferred embodiment consist of, for example, circuit switched, paging, and packet data networks and include but are not limited to AMPS, CDMA, TDMA, GSM, iDEN, GPRS, 1XRTT, 3XRTT, W-CDMA, CDMA 2000, ReFLEX, ARDIS, and MOBITEX. The presently preferred embodiment will be described in reference to a wireless handset device 100 using a WAP microbrowser operating over a circuit-switched CDMA network. Modifications to the data gathering software 110 to gather data from other wireless networks and devices will be apparent to those of ordinary skill in the art. It will be appreciated, however, that the principles of the invention described herein may be applied to other wireless devices as well.

The data gathering software 110 tracks the usage and performance of individual user activity of wireless voice and wireless data services. In the presently preferred embodiment, data gathering software 110 resides on the mobile station modem (MSM) or equivalent device modem of wireless device 100. In alternative embodiments, the data gathering software 110 may reside, for example, embedded in microbrowser applications or on the operating system of the wireless device 100. Information collected by the data gathering software 110 may be stored on the MSM or equivalent device modem or when applicable, the SIM card or the device's volatile and/or non-volatile memory. In another embodiment, the data gathering software 110 may collect and transmit data real-time. In the preferred embodiment automatic data delivery may be triggered on a periodic basis, or alternatively data delivery may be launched via user or control center driven activity. For example, in the case of control center driven activity, commands may be sent to the data gathering software 110 via a server, or like mechanism, to collect certain data after which collected data may be routed through an intermediate server that then feeds data to the control center.

Data gathering software 110 may be equipped with standard features such as an installation application, a system configuration and application scanner, automatic software update feature, data compression algorithm and data encryption system. These standard features are well known to those of ordinary skill in the art. The installation application may prompt the user for household/user profile information and request confirmation of user consent to the data gathering process before the data gathering software is launched. After the initial installation process, the data gathering software 110 is transparent to the user during operation of the wireless device 100. The system configuration and application scanner records detail relating to the configuration features and specifications of the wireless device 100 and any applications loaded onto it. Data collected by the data gathering software 110 may undergo a filtering process to remove extraneous data and may also be compressed using standard data compression techniques to conserve memory resources on the wireless device 100 as well as to enable more efficient transfer of data to the control center 120. Data gathered may also be encrypted using standard encryption techniques to provide security for the data collected from the user's wireless data activities and to provide privacy to protect the user's identity.

In the presently preferred embodiment, the data gathering software 110 residing on the wireless device MSM is written in C++, while in alternative embodiments it may be written in other coding languages such as Java or the like. The data gathering software 110 operates in the background of the wireless device's 100 operating system and standard applications. The design of the data gathering software 110 adheres to and incorporates wireless protocols and standards for voice and data communication services on CDMA networks and devices. These documents include (1) TIA/EIA-95-B (Mobile Station-Base Station Compatibility for Wideband Spread Spectrum Cellular Systems), (2) ANSI J-STD-008 (Personal Station-Base Station Compatibility Requirements for 1.8 to 2.0 GHz Code Division Multiple Access Personal Communication Systems), (3) ANSI J-STD 018 (Minimum Performance Requirements for 1.8 to 2.0 GHz Code Division Multiple Access Personal Stations), (4)

TIA/EIA/IS-99 (Data Services Option Standard for Wideband Spread Spectrum Digital Cellular Systems), (5) TIA/EIA-637-A (Short Message Service for Spread Spectrum Systems), (6) TIA/EIA-683-A (Over-the-Air Provisioning of Mobile Stations in Spread Spectrum Systems), and (7) various WAP documents (Wireless Application Protocol Architecture Specification, Wireless Application Environment Specification, Wireless Telephony Application Specification, Wireless Transaction Protocol Specification, Wireless Datagram Protocol Specification).

Features of the data gathering software 110 include the ability to collect disparate data streams; data filtering mechanisms; default data collection protocols; real-time event, user and control center driven data collection routines; a storage system; and a file transfer system. The data gathering software 110 is also designed with interoperability in mind without interference with subscriber software installed on the wireless device.

The data gathering software 110 is loaded onto the wireless device 100 through an external download process. In the preferred embodiment, this is done through a "flash" load process. In the flash load process, the wireless device 100 is taken off line and connected through the serial port connector to a PC via the specified cable interface for the device. A script command is entered into the PC and initiates the application of a series of electrical currents to specific pins of the wireless device 100 that are reserved exclusively for software loading. Through this connection the data gathering software 110 is transferred to the MSM of the wireless device 100. At the end of the flash load process the wireless device 100 is restarted, with the data gathering software 110 now functioning. In alternative embodiments, the external download could be done, for example, through a wired or wireless synchronization process or through an Over-the-Air [OTA] process. The data gathering software may be loaded, alternatively, at the time of manufacture of the wireless device. For example, the data gathering software may be loaded as part of a browser application installed by the manufacturer of the wireless device.

Figure 2:
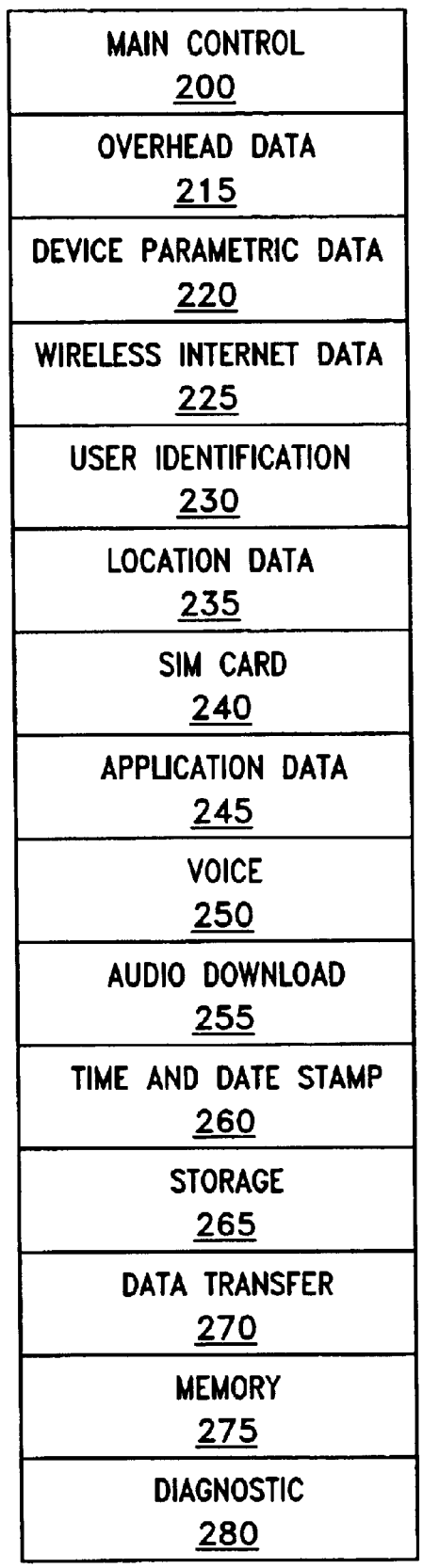
FIG. 2 sets forth the component modules of data gathering software of the embodiment of FIG. 1.

Referring to FIG. 2, the component modules of a presently preferred embodiment of the data gathering software 110 are shown. The data gathering software 110 is based on a common Application Development Interface. The data gathering software 110 consists of a Main Control Module (MCM) 200 along with additional modules that plug in and perform specific tasks seamlessly with the underlying subscriber software. In the presently preferred embodiment, these component modules include an Overhead Data Module 215, a Device Parametric Module 220, a Wireless Internet Data Module 225, User Identification Module 230, Location Data Module 235, SIM Card Data module 240, Application Data Module 245, Voice Module 250, Audio Download Module 255, Time and Date Stamp Module 260, Storage Module 265, Data Transfer Module 270, Memory Module 275, and Diagnostic Module 280. Each module performs tasks in all active wireless device modes (e.g., idle, voice conversation and data), but some module data sets may differ from mode to mode. It should also be noted that data modules may be run in parallel.

Figure 2A:
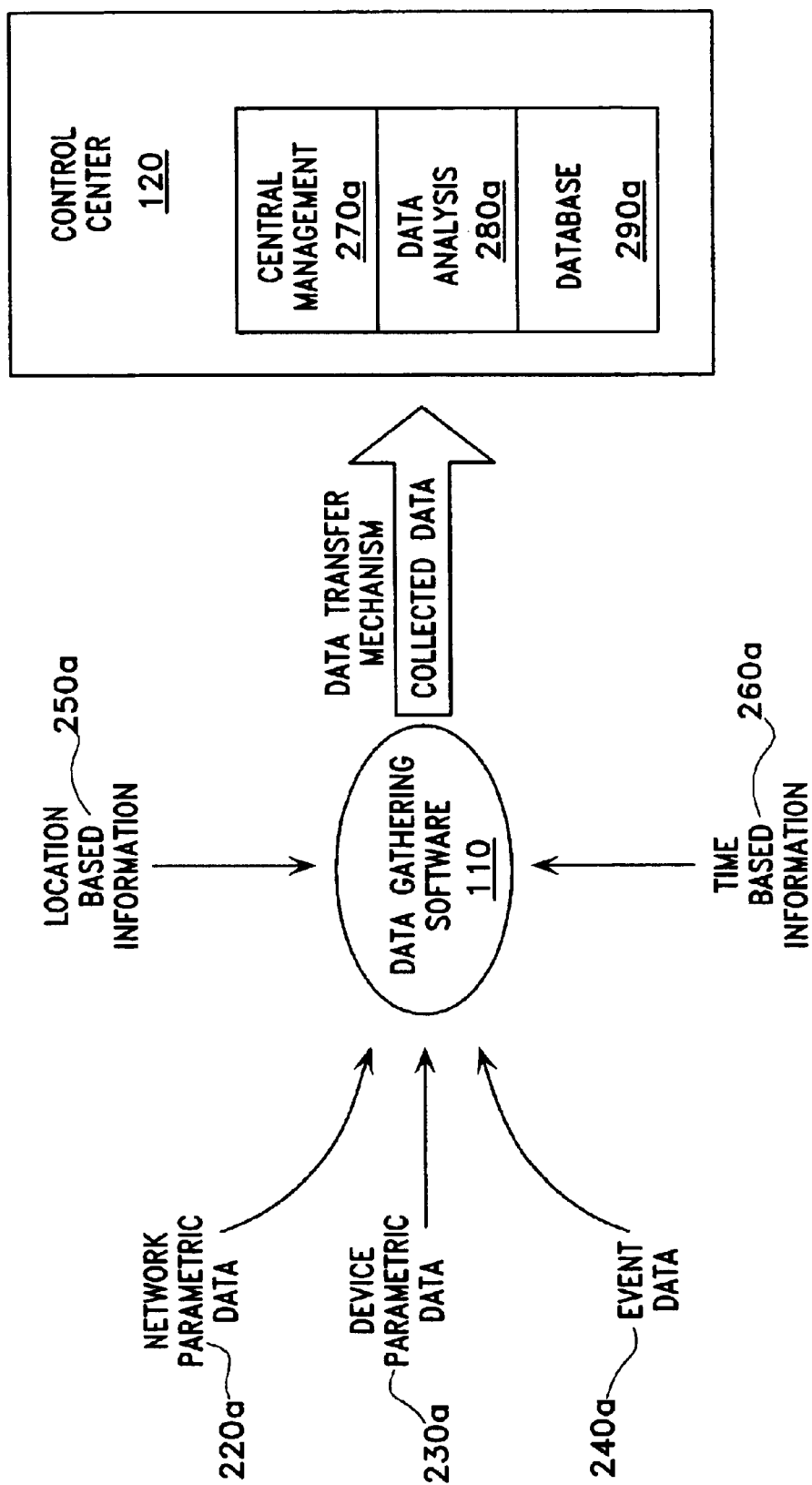
FIG. 2a sets forth an illustration of the operation of the architecture shown in FIGS. 1 and 2.

Referring to FIG. 2a, a simplified illustration of the operation of the presently preferred embodiment of the invention is shown. At the center of the system is the data gathering software 110. Data gathering software 110 monitors and collects several types of information from different sources including event data 240a, device parametric data 230a, network parametric data 220a, location information 250a, and time information 260a. Data gathering software 110 may be activated by user event driven activity, or alternatively, control center driven activity such as in cases in which commands are sent to the data gathering software 110 via server, or like mechanism, to collect certain data after which collected data is routed to an intermediate server, or like mechanism, that then feeds data to the control center. The collected data is sent to the control center 120 where it is managed via a central management system 270a and undergoes data analysis 280a. The collected data and analysis results are stored in a database 290a.

Event data 240a includes any data relating to activity on the device by a user. For example, event data includes data from data applications, device applications, and event statistics. Data applications include, for example, microbrowser or equivalent internet browsing activity, web clipping applications, mobile commerce transactions, mobile advertising activity, e-mail activity, and Bluetooth application usage. Device applications include, for example, games, address books, personal information management software, and media players used for streaming audio and video. Event statistics include, for example, voice and data call activity and SMS or similar text messaging activity. Network parametric data 220a includes for example, in the case of CDMA, overhead messaging data such as systems parameters messages, authentication challenge messages, and service redirection messages. Device parametric data 230a includes, for example, battery statistics (such as charging state, voltage, last charge and temperature), energy/interference parametrics, receive/transmit power, frame error rate, call set-up statistics (such as access time, call origination, and call termination). Sources from which data is collected may include various components of the wireless device, such as processors (including the mobile station modem or equivalent, global positioning system processor or equivalent, and other central processing units on wireless devices), volatile and non-volatile memory locations, and embedded applications such as a microbrowser, game, or audio file player.

Referring to FIG. 2, a description of each module follows:
1. Main Control Module (MCM)

The MCM 200 is responsible for the management and control of the data gathering software activities. The MCM 200 sends requests and instructions and receives messages from other modules. For example, the MCM 200 performs functions such as tasking, command and control, configuration, and upgrades to the data gathering software 110 itself.

2. Overhead Data Module (ODM)

The ODM 215 collects information by monitoring the overhead message stream. While the wireless device 100 is powered on, information is collected while the device 100 is in any state such as idle, conversation, and data mode. A list of sample overhead messages monitored by the data gathering software 110 is shown in FIG. 3. Information collected by the ODM 215 includes, for example, network information such as call performance, coverage, configuration settings, and management; event information such as voice call, data call, and Short Message Services (SMS) activity; location information such as longitude, latitude, and GPS data; and time and date information.

3. Device Parametric Data Module (DPDM)

The DPDM 220 monitors and collects information from the network and device. A list of the sample data monitored and collected by the DPDM 220 is in FIG. 4. Information collected by the DPDM 220 includes for example, receive power, transmit power, frame error rate [FER], signal strength [RSSI], access time [call setup], time stamp, date stamp, location data, and airtime usage. The information collected can be used to gain insights into the performance of networks and devices in the environment.

4. Wireless Internet Data Module (WIDM)

The WIDM 225 monitors and collects information from internet-based applications such as a microbrowser or web query application. When launched, the internet-based application enters a session through the wireless network with different types of network servers such as proxy, gateway, content and application servers. Today, multiple types of protocols and mark-up languages exist and are designed to make various types of content, applications, and services accessible to wireless devices. Examples of such protocols and mark-up languages include the Wireless Application Protocol [WAP], Palm Query Applications [PQAs], iMODE, HDML, WML, XML, and HTML. Once a wireless connection to the internet and/or the network provider's data network (or equivalent) has been established, accessing WML content from a wireless phone through the WAP protocol is very different from accessing HTML content via traditional personal computer applications like Microsoft Explorer or Netscape Navigator. For example, WML introduces the concept of decks and cards, a concept that does not exist in HTML. Cards specify one or more units of user interaction. A deck represents the unit of content transmission that is sent over the wireless network to the device. Therefore, a deck can contain one or more cards. A user can navigate through multiple cards before sending a request over the network to retrieve an additional deck.

5. User Identification Module (UIM)

The UIM 230 is responsible for collecting data from the user of the wireless device 100 through invoking a questionnaire in certain circumstances and prompting the wireless user to input desired information. Examples of information collected by the UIM 230 include User name, Date of birth, Sex, Race, Income, Address, Marital status, Education, Occupation, and User authentication or password.

6. Location Data Module (LDM)

The LDM 235 is responsible for collecting all data relating to location such as longitude, latitude, GPS data, time stamp, and date stamp. The collected data can be referenced back to wireless device 100 events and statistics. The LDM 235 may also collect additional information so that the location information can be used to determine the user's direction of travel, speed, and time in order to correlate the information to specific events.

7. SIM [Subscriber Identity Module] Card Data Module (SCDM)

The SCDM 240 interfaces the wireless device's SIM card and is responsible for collecting data stored on the wireless device's 100 SIM card.

8. Application Data Module (ADM)

The ADM 245 is responsible for monitoring the activity of all applications resident on the wireless device 100. The ADM 245 collects data about all resident applications such as the application name, usage statistics, application file size, and configuration information. The ADM 245 collects information at multiple instances such as when applications are loaded, removed, launched, restored, switched, and terminated.

9. Voice Module (VM)

The VM 250 is responsible for collecting information relating to voice commands, applications, and activity. In addition to the conventional keypad or stylus based functions users may also have the ability to perform various activities using voice commands and responses. Such voice commands and responses may include voice-to-text and text-to-voice conversions, voice activated dialing, voice activated microbrowsing, and voice controlled applications. The VM 250 monitors activity in voice recognition engines and processors and collects information related to any such user activity conducted via voice.

10. Audio Download Module (ADM)

The ADM 255 is responsible for collecting audio-based user activity. Users may receive/download audio from their wireless devices in the form of advertisements, music, and the like. The ADM 255 will capture data relating to such activity.

11. Time and Date Stamp Module (TDSM)

The TDSM 260 monitors and collects information from the network and device parameters. Examples of information collected by the TDSM 260 include the time, which can be represented in hours, minutes, and seconds, and the date, which can be represented in month, day, year. The information collected by the TDSM 260 can be integrated with information collected from other data modules so that time and date information can be associated with event data.

12. Storage Module (SM)

The SM 265 is responsible for collecting information from each data module and encrypting, compressing, and storing the data in log file format in the non-volatile memory locations of the wireless device.

13. Data Transfer Module (DTM)

The DTM 270 sends information collected by the data gathering software 110 to the control center 120. The DTM 270 can operate in multiple modes including automatic, pull, and push. In automatic mode, the DTM 270 sends data to the control center 120 based on a predetermined set of factors. In pull mode, the DTM 270 sends data based on commands received from the control center 120. This may include, for example, activity in which commands are sent to the data gathering software 110 via server, or like mechanism, to collect certain data after which collected data is routed to an intermediate server, or like mechanism that then feeds data to the control center. In push mode, the DTM 270 sends data based on commands from the user. The DTM 270 also performs standard functions relating to the transfer of data such as packetizing the collected data, attaching identifying information to the packets of data, and initiating, executing, and managing the data transmission process. The transmission process could include for example, sending the collected data to the control center 120 through a mobile originated Short Message Service [SMS] message, sending the collected data during a microbrowser session, or sending the collected data through a synchronization application.

14. Memory Module (MM)

The MM 275 is responsible for clearing the memory location once the DTM 270 has successfully transmitted the collected data to the control center 120. The MM 275 receives commands from the DTM 270 in conducting this operation.

15. Diagnostic Module (DM)

The DM 280 is responsible for running diagnostic tasks on the MCM 200 and other modules of the data gathering software 100. The DM 280 is responsible for self-updating any data gathering software 110 module to add features or correct any bugs and for resetting and rebooting the wireless device if it detects a problem with data gathering software 110 activity.

Figure 6:
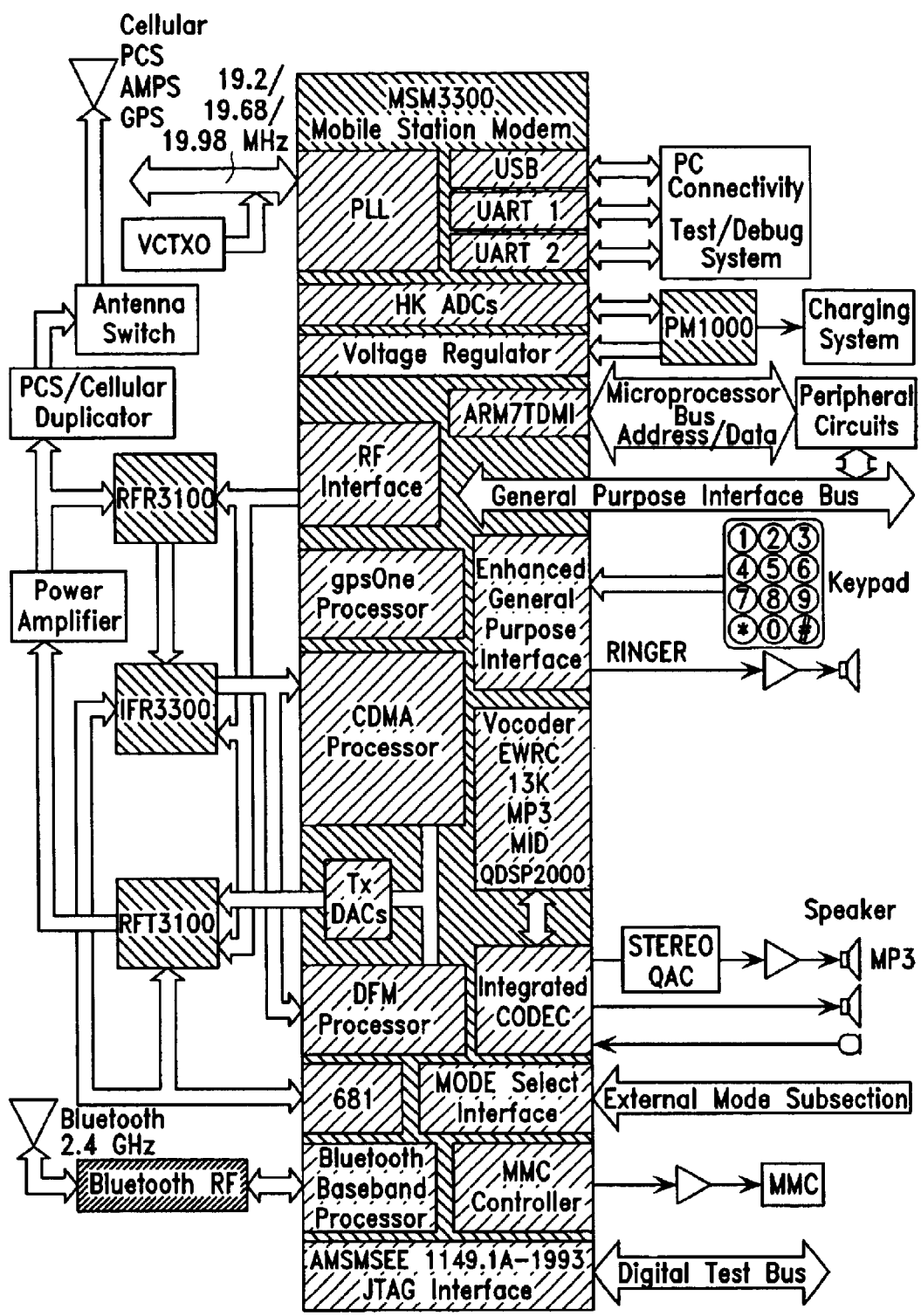
FIG. 6 sets forth a sample mobile station modem (MSM) wireless device function block of the embodiment of FIG. 1.

FIGS. 5a, 5b, and 5c, and 5d set forth a log 500 of sample event type data gathered by the various component modules of the data gathering software 110 and the MSM location from which various metrics corresponding to event types are gathered. FIGS. 5a, 5b, 5c, and 5d are for illustrative purposes, and do not set forth a complete list of types of event type data gathered. Referring to FIG. 6, a sample wireless device 100 functional block diagram for an MSM is set forth. The sample wireless device 100 functional block diagram is only one potential embodiment of a wireless device 100 modem from which metrics can be gathered. For illustrative purposes, event types in the log are divided into the categories of basic phone functions, voice call events, browser call events, M-Commerce, M-Advertising, and SMS messaging. These categories are for illustrative purposes only of the types of event data that are gathered by various component modules of the data gathering software 110 and are neither exhaustive nor complete. Referring to FIG. 5a, for each event type 510, there are corresponding metrics 520 which are collected by various component modules of the data gathering software 110. The MSM Location 530 of the MSM shown in FIG. 6 from which the Metrics 520 are gathered is also set forth. For example, for the Event Type "Mobile Voice Call Connect" 540 shown in FIG. 5b, the Metrics 520 gathered are TD-LL information (Time, Date, Long-Lat), Vocoder, Transmit Power, Receive Power, and Frame Erasure Rate. These Metrics 520 are gathered from the CDMA Processor and GPS Processor at the MSM Location 550 by the Overhead Data Module 215. Similarly, other Voice Call Event Types such as Land-Side Voice Call and Mobile Voice Call End shown in FIG. 5b are collected by the Overhead Data Module. Event types such as External Power Applied and Power Up shown in FIG. 5a are collected by the Device Parametric Module 220. Event Types such as Mobile Browser Launch and Deck (URL) Request are gathered by the Wireless Internet Data Module 225.

Figure 11:
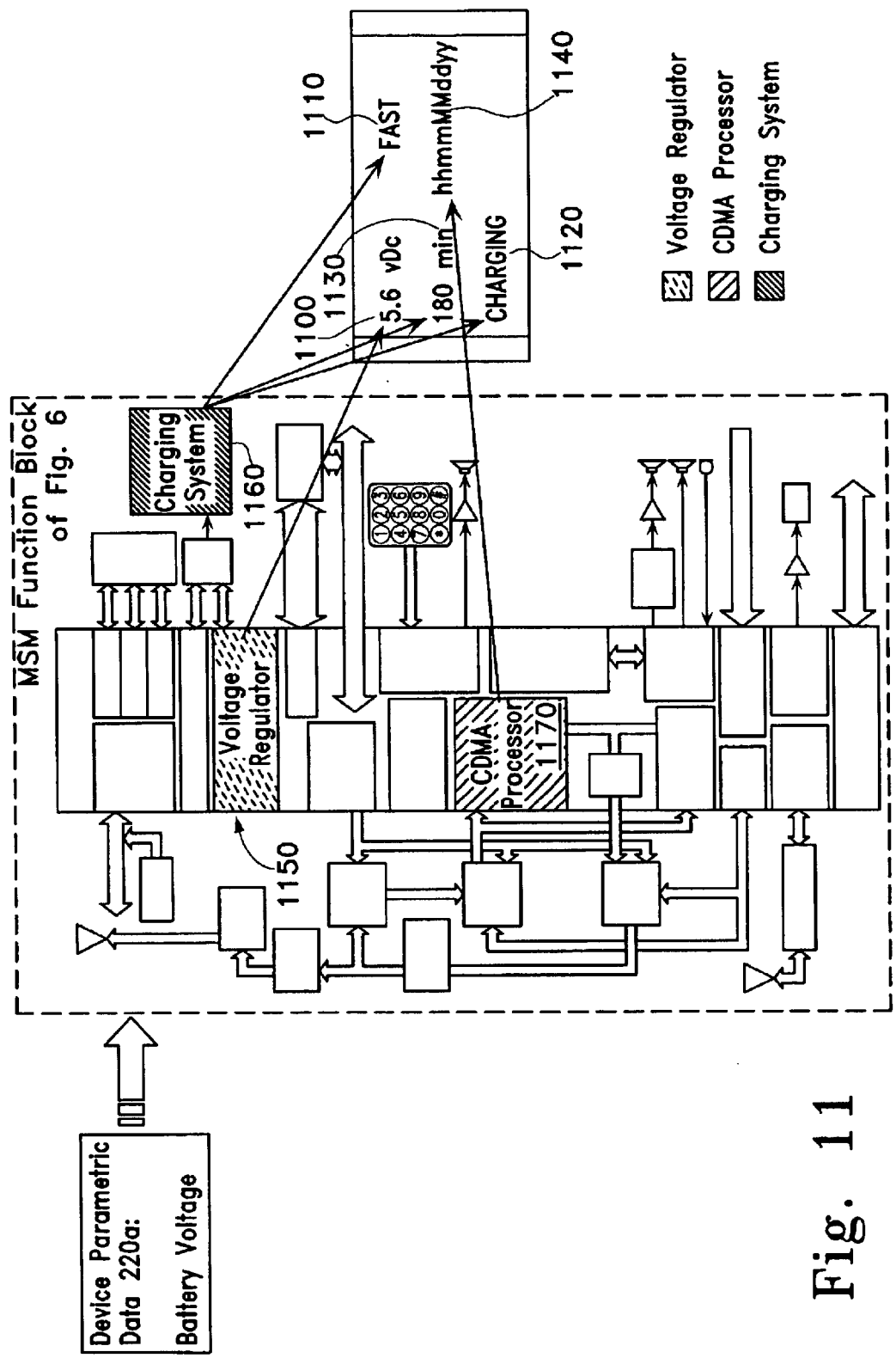
FIG. 11 shows an illustration of the MSM locations where device parametric data is collected.

Referring to FIG. 11, an illustration of the MSM locations where device parametric data pertaining to battery status is shown. The current battery voltage 1100 is obtained from the voltage regulator 1150. Charge rate 1110, charging state 1120, and charge time 1130 are obtained from the charging system 1160. Time stamp information 1140 is obtained from the CDMA processor 1170.

Referring to FIG. 5, Metrics 520 are gathered from messaging information at the various MSM Locations 530. FIG. 7 shows sample messaging from the CDMA Processor of an MSM used to identify the Metric of whether a call is a data call or a voice call. Two potential origination messages under the CDMA messaging standard TIA-95-B are shown, origination message 710 and origination message 720. For example, the value of the special service code 730 or similar identifier, such as a service option code, may identify whether a call is a data call or a voice call. In this example, a special service code 730 value equal to zero indicates a data call whereas a value equal to one indicates a voice call. Thus, the data gathering software 110 can determine whether a call is a voice call or a data call by parsing the origination message collected from the CDMA processor. In the examples shown in FIG. 7, origination message 710 corresponds to a data call whereas origination message 720 corresponds to a voice call.

Figure 8:
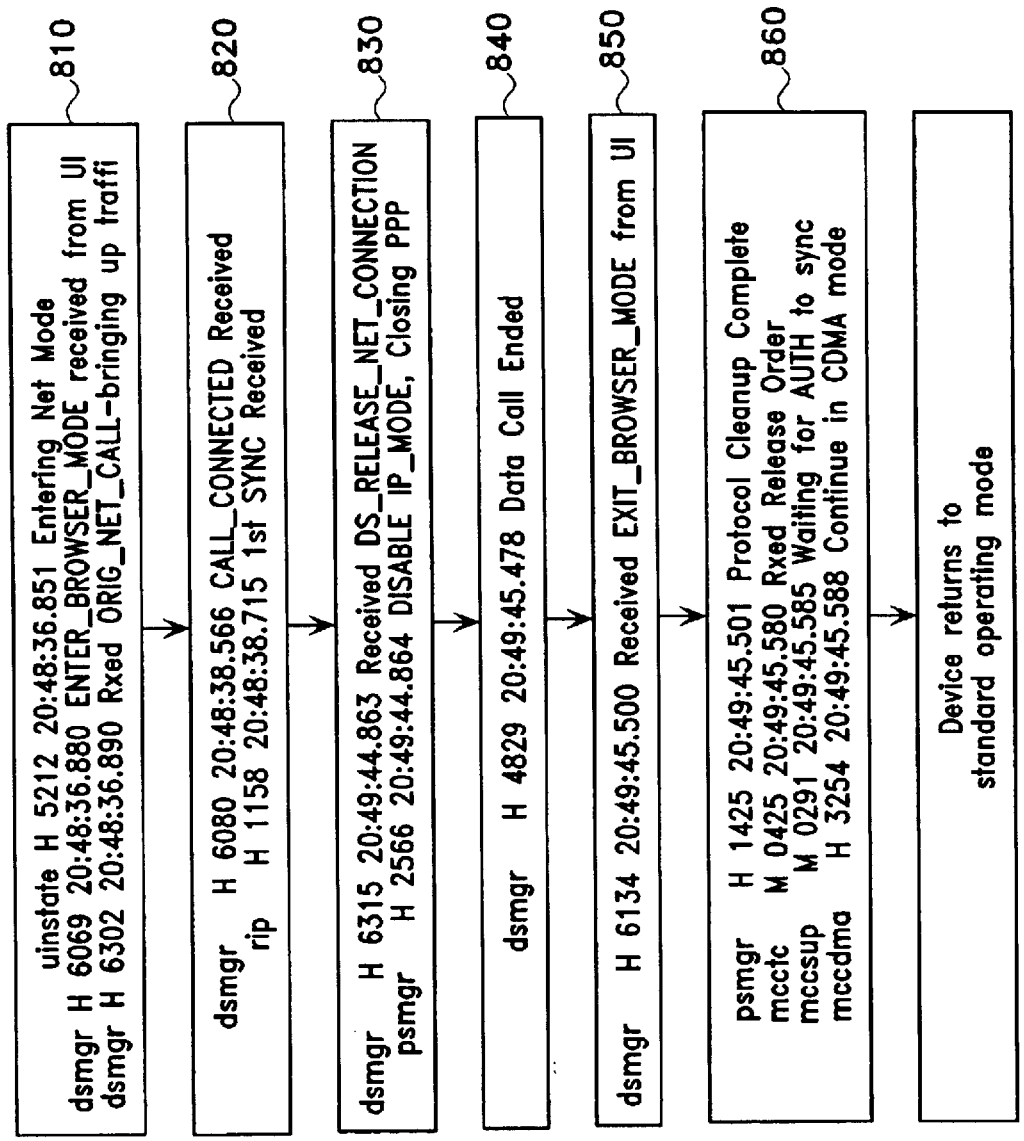
FIG. 8 sets forth a flow chart for messaging at the wireless device of FIG. 6 relating to the launch, use, and termination of use of a wireless microbrowser.

Referring to FIG. 8, messaging at the CDMA processor of the MSM relating to metrics for the launching, use, and termination of use of a wireless microbrowser is set forth. At block 810, messaging corresponding to the entering of the microbrowser mode are set forth. At step 820, messaging relating to the connection of the call for microbrowsing is set forth along with messaging indicating the radio link protocol (rlp) for synchronization of the call with the network. Step 830 shows messaging for releasing the network connection indicating the ending of use of the browser. Step 840 shows messaging for the ending of the microbrowser call, and Step 850 shows messaging for exit from the user interface of the browser mode. Step 860 shows messaging relating to the resetting of various parameters to return the device to standard operating mode.

Figure 9:
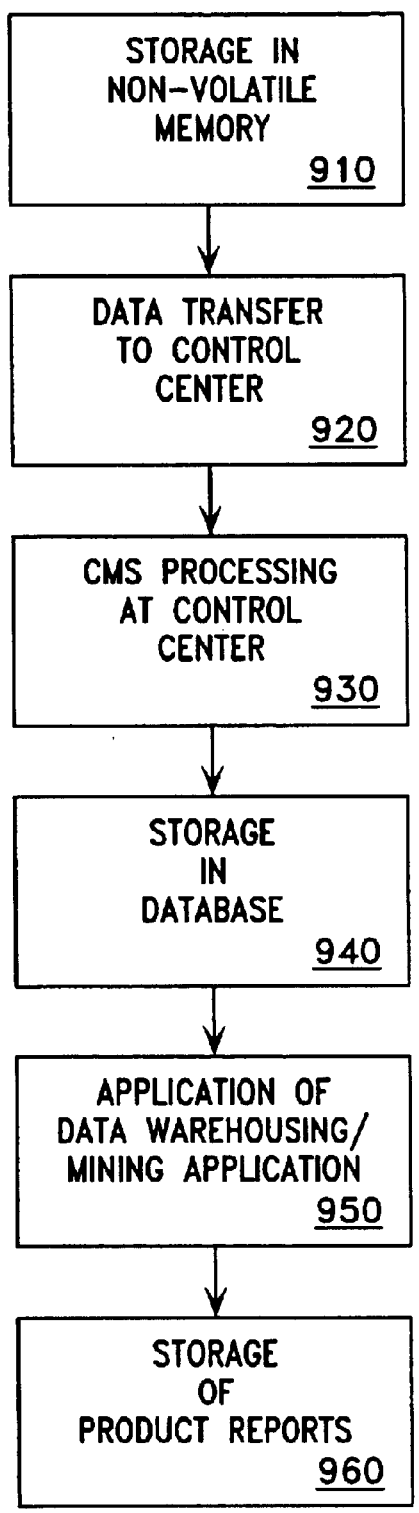
FIG. 9 sets forth a flow chart of the path of data collected by data gathering software of the embodiment of FIG. 1.

Referring to FIG. 9, a diagram showing the flow of data collected by the data gathering software 110 in the presently preferred embodiment of the invention is presented. At 910, the collected data is stored at each wireless device 100 in the non-volatile memory (or equivalent) of the wireless device 100. At 920, the collected data is sent over a wireless link 130 to a control center 120 that manages the collection and quality control processes of the data from each wireless device 100 in the field as well as the overall administration of the network. At the control center 120, management of data collection and quality control processes is handled by a Central Management System (CMS) 230a. A graphic user interface (GUI) client allows the CMS administrator at the control center to communicate and run checks during the data management process. At 930, the CMS 260a prepares the data received for database processing. This preparation includes decompressing files, cataloging and archiving the files and staging files for database entry. To perform its activities, the CMS may include an administration server, web server, contacting server, name server, FTP server, VPN server, data collection manager server, alarm manager server, event manager server, and configuration manager server.

At 940, the prepared data is then loaded and stored in a database. The database uses device identification number, device type, user ID, event type, network identification, market identification, and longitude/latitude coordinates in tables to cross-reference values in a user information table for each event (i.e., message).

At 950, a data warehouse/mining application processes the collected data stored in the database to generate information including usage, service functionality, network and device performance metrics. This process may include: sorting through collected data to ascertain demographic profiles of panel members and related location/market information; analyzing usage behavior of panel members or aggregating groups of panelists, including but not limited to metrics such as share of messaging by voice, microbrowsing, SMS, e-mail and secure transactions; analyzing peak/off-peak usage patterns of panel members as well as average usage days per given period of time; analyzing telephony metrics including, for example, call duration, incoming versus outgoing calls, local versus long distance calls, voicemail functions, and digital versus analog mode; analyzing wireless data/internet metrics including, for example, reach (i.e., percentage of all users who visit a particular Website during a given time period), unique visitors (i.e., number of Web-active individuals who visited a particular site or web property within a given time frame), top sites or URLs visited during a given period of time, top sites bookmarked, counts of secure transactions placed during a given period of time, visits to non-Web digital media sites over a given period of time, click streams, advertisement views and responses; analyzing functionality of various wireless voice and data/internet services provided to users whereby number of hits per site or application versus total offerings may provide such indication; analyzing performance metrics related to the device, including but not limited to keypad operation, CPU processing capabilities, RF calibration, transmit and receive power, power consumption, battery charging, voltage and temperature;

and analyzing performance metrics related to the operators' networks, including but not limited to RSSI, access failures, finger assignments, handoff and vocoder activity, transmit and receive power, frame error rates, dropped calls, blocked calls, connection speeds, internet or Web application download speeds, and secure transaction speeds. The generated information can be used to produce marketing information products, network performance products, device performance products, and integrated products that are useful to network operators, advertisers, content providers and producers of wireless voice and data services and products. At step 960, these end products (i.e., reports), which may take the form of hard copy and/or Web-based delivery, are stored at the database.

Usage, Audience, and Purchase Products

This competitive marketing information is mainly derived from the activity, usage, and behavior of the wireless device 100 users. Some general measurements include the numbers and demographics of users; the types of wireless devices and networks they use; sites they visit and bookmark; secure transactions they execute; advertisements they view/redeem. While these types of measurements provide much needed and valuable information as is, the ability of the data gathering software 110 to integrate time and location-based (i.e., environment driven) information with such user activity (i.e., event driven) measurements provides an unprecedented breadth of information never before available to the industry. The ability to understand where and when subscribers are using their wireless device 100 for wireless data and internet applications allows industry players to create novel marketing strategies that have not been possible in the wired internet space. Referring to FIGS. 10*a* and 10*b*, sample reports with respect to number of unique visitors to a site and total number and time of data sessions are shown. It should be noted that reports produced on wireless devices and networks via the system and related methods for measuring wireless device and network usage and performance metrics according to the invention have not been available to the industry.

Sample product reports on the following topics may be cut by time and location of user-based activity as well as trended over a period of time:

Data Traffic Report:
  Mix of messaging activity (or sessions) by SMS, e-mail, web visits, web downloads, m-commerce transactions
  Reach (i.e., percentage of all wireless internet users who visit a particular site during a given month)
  Unique visitors (i.e., number of wireless internet-active individuals who visited a particular site or web property within a given time frame; each panel member is represented once as a unique user)
  Top URLs visited (e.g., by subject, by portal, by domain, by individual sites with a domain, by group/entity, etc.)
  Top sites bookmarked (and whether these change over a period of time)
  Number of secure transactions completed
  Average unique web pages visited
  Average usage (days) per month
  Peak/off-peak usage periods
  Cuts by carrier, market, demographics
Voice Statistics Report:
  Call frequency
  Local vs. long-distance
  Call duration
  Call origination
  Cuts by carrier, market, demographics
Demographics Report:
  Age
  Gender
  Occupation
  Education
  Household composition—# of members, median income; homeowner/renter
  Geographic location
  Cut by user activity
M-commerce Report:
  Secure transactions to identify consumer purchasing behavior
  Lookers/bookers
  Repeat visitors/purchasers
  Top products sold
  Revenue per site
  Reach
  Referring sites
  Cut by demographics
Non-Web Digital Media Report:
  Activity on proprietary services such as AOL, Juno, PointCast
  Reach
  Referring sites
  Cut by demographics
Advertising Report:
  Ads viewed/redeemed
  Top advertisers
  Top host sites
  Reach
  Cut by demographics
User Experience Report:
  Time to download home page of URL
  Time to complete secure transaction
  Browsers visitors are using
  Error log (i.e., times when site fails not related to ISP/backbone problems)
  Congestion periods
Technical Report:
  Device configuration & software applications
  Hardware components Network/Device Performance Products In addition to collecting event data based on consumer usage, it is an object of the invention to collect quality of service (QOS) data as well. According to the invention, QOS data may be captured by monitoring network parametric data and device parametric data based on the activities of the panel users. The ability to record real-time metrics on network and device performance driven by "live" user activity is unprecedented in the industry. Such data collected and processed via the data warehouse/mining application may yield reports on how the networks and devices are performing based on specific user event driven activities. Current drive tests and manufacturers' device tests do not have this capability (i.e., are performed independently of real-time consumer-based activity). Moreover, the invention allows for the QOS metrics to be correlated to time and location of user activity.

Sample product reports on the following topics may be cut by time and location of user-based activity as well as trended over a period of time:

Network Performance Report:
  Vocoder activity
  Frame error-rates
  Closed loop power control
  Transmit/receive power
  Channel assignments
  Base station acknowledgement order
  Global service re-direct
  Hand-off activity
  Speed
  Access time
  Audio quality/MOS score Device Performance Report:
  Battery measurements (voltage, temperature, charge time, power consumption, power amplifier)
  Idle vs. normal mode
  Analog vs. digital mode
  RF calibration
  Transmit/receive power
  Minutes used
  Finger assignments
  CPU measurements

Integrated Products

Event data, network parametric data, and device parametric data collected and processed may be interpreted not only on a stand-alone basis but also integrated with one another to provide more robust data. To date, this has not been possible since industry players have had to source the various pieces of information from different parties; even then, the data was collected from disparate devices during different time periods. The invention provides for a unique feature such that event data, network parametric data and device parametric data are collected simultaneously in real-time from the same wireless device 100, allowing for directly comparable data that, when viewed in concert, provides a richer set of information. For example, a problem detected in the network may be correlated to specific user activity in a particular location and time.

In order to generate the most accurate and representative reports, a wireless device 100 equipped with the data gathering software 110 is to be distributed and used by a targeted group of wireless communications services users to collect statistically representative data. A statistical sampling methodology will be employed so that this panel of users may represent a broader audience and typify various demographic profiles. The panel will also be constructed to allow for national, regional, and market level reporting. Participation in the panel will be on an opt-in, incentive-driven basis whereby panel members agree to have their wireless voice and data/internet usage captured via the data gathering software 110 resident on their wireless device 100. While most of the monitoring process will require no involvement on the user's part and will remain transparent to the user, each participant will agree to disclose basic user profile information upon commencement of activity and upon certain other conditions.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiment but, on the contrary, is intended to cover various modifications and equivalent arrangements included within the scope of the appended claims.

What is claimed is:

1. A system for measuring wireless device and wireless network usage and performance metrics comprising:
  a wireless device with a processor and memory;
  data gathering software installed on said wireless device for collecting
  device parametric data;
  network parametric data; and
  event data, wherein the device parametric data, network parametric data, and event data are based on user activity of the wireless device.

2. The system of claim 1 wherein said device parametric, network parametric, and event data are collected from said processor and memory of said wireless device.

3. The system of claim 1, wherein said event data comprises data applications data.

4. The system of claim 3, wherein said data applications data comprises internet browsing activity data.

5. The system of claim 3, wherein said data applications data comprises web clipping applications data.

6. The system of claim 3, wherein said data applications data comprises mobile commerce transactions data.

7. The system of claim 3, wherein said data applications data comprises mobile advertising activity data.

8. The system of claim 3, wherein said data applications data comprises e-mail activity data.

9. The system of claim 3, wherein said data applications data comprises Bluetooth application usage.

10. The system of claim 1, wherein said event data comprises device applications data.

11. The system of clam 10, wherein said device applications data comprises games data.

12. The system of claim 10, wherein said device applications data comprises address book data.

13. The system of claim 10, wherein said device applications data comprises media player data.

14. The system of claim 10, wherein said device applications data comprises personal information management software data.

15. The system of claim 1, wherein said event data comprises event statistics data.

16. The system of claim 15, wherein said event statistics data comprises voice and data call activity.

17. The system of claim 15, wherein said event statistics data comprises text messaging activity.

18. The system of claim 1, wherein said network parametric data comprises overhead messaging data.

19. The system of claim 1, wherein said device parametric data comprises battery statistics data.

20. The system of claim 1, wherein said device parametric data comprises energy/interference parametrics.

21. The system of claim 1, wherein said device parametric data comprises receive and transmit power.

22. The system of claim 1, wherein said device parametric data comprises frame error rate data.

23. The system of claim 1, wherein said device parametric data comprises call set-up statistics.

24. The system of claim 1 wherein said collected data is stored in said wireless device memory.

25. The system of claim 1 wherein said data gathering software installed on said wireless device further collects wireless device location data.

26. The system of claim 1 wherein said data gathering software installed on said wireless device further collects time stamp data.

27. The system of claim 1 further comprising a control center for receiving said device parametric data, network parametric data, and event data.

28. The system of claim 27 further comprising an intermediary server which collects certain device parametric, network parametric, and event data prior to routing to said control center.

29. The system of claim 27 wherein said device parametric data, network parametric data, and event data are transmitted real time to said control center.

30. The system of claim 27, wherein said control center also stores and processes said device parametric data, network parametric data, and event data.

31. The system of claim 1, wherein said data gathering software is installed on said processor of said wireless device.

32. The system of claim 1, further comprising a micro-browser installed on said wireless device, on which said data gathering software is installed.

33. The system of claim 1, further comprising a micro-browser installed on said wireless device, with which said data gathering software interfaces.

34. The system of claim 1, further comprising an operating system installed on said wireless device, on which said data gathering software installed.

35. The system of claim 1, further comprising a panel of a plurality of selected users, wherein each selected user of said plurality of selected users receives a wireless device with said data gathering software installed.

36. The system of claim 1, wherein said data gathering software is installed on said wireless devices via a flash load process.

37. The system of claim 1, wherein said data gathering software is installed on said wireless devices via Over-the-Air provisioning.

38. The system of claim 1, wherein said data gathering software is installed on said wireless devices via a synchronization process.

39. The system of claim 1, wherein said data gathering software is installed on said wireless devices at the time of manufacture.

40. The system of claim 1, wherein said data gathering software records internal and external communications from said wireless device, where internal communications relate to messaging from operating system or applications within said device and external communications relate to messaging sent or received from said device to or from a communication port, or wireless communication network based on user activity on said wireless device.

41. The system of claim 1, wherein said data gathering software captures data as it relates to wireless voice communications activity.

42. The system of claim 1, wherein said data gathering software captures data as it relates to wireless data or internet communications activity.

43. The system of claim 1, wherein said data gathering software captures real-time wireless communications activity that is both user driven and control center driven.

44. The system of claim 1 wherein a filtering mechanism may be implemented to remove extraneous data or irrelevant messaging before transmission to the control center.

45. The system of claim 1 wherein certain portions of data collected from said wireless device are encrypted.

46. The system of claim 1 wherein a data compression algorithm within said wireless devices may reduce the size of data files collected to conserve memory resources.

47. The system of claim 1, wherein said event data relates to usage and activity of wireless voice and data/internet services.

48. The system of claim 47, wherein said data gathering software correlates location and time of user activity with said event data relating to usage and activity of wireless voice and data/internet services.

49. The system of claim 1 wherein said data gathering software captures real-time network parametric data based on actual user activity.

50. The system of claim 49 wherein said data gathering software captures network parametric data that are event and environment driven.

51. The system of claim 1 wherein said data gathering software captures real-time device parametric data based on actual user activity.

52. The system of claim 51, wherein said data gathering software captures real-time device parametric data that is event and environment driven.

53. A system for measuring wireless device and wireless network usage and performance metrics comprising:
a wireless device with a processor and memory;
data gathering software installed on said wireless device for collecting device parametric data;
network parametric data; and
event data, wherein said data gathering software simultaneously captures said device parametric data, network parametric data, and event data based on real-time user activity of said wireless device.

54. The system of claim 53 wherein said captured device parametric data, network parametric data, and event data is event and environment driven.

55. A system for measuring wireless device and wireless network usage and performance metrics comprising:
a means for collecting device parametric data from a wireless device;
a means for collecting network parametric data from said wireless device;
a means for collecting event data from said wireless device; and
a means for transmitting said device parametric data, network parametric, and event data via a wireless communication network to a control center for processing, wherein the device parametric data, network parametric data, and event data are based on user activity of the wireless device.

56. An apparatus for measuring wireless device and wireless network usage and performance metrics comprising:
a software module for collecting device parametric data from a wireless device;
a software module for collecting network parametric data from said wireless device;
a software module for collecting event data from said wireless device; and
a software module for transmitting said device parametric data, network parametric data, and event data via a wireless communication network to a control center for processing, wherein the device parametric data, network parametric data, and event data are based on user activity of the wireless device.

57. The apparatus of claim 56, wherein said software module for collecting network parametric data from said wireless device collects said network parametric data from a processor on said wireless device.

58. The apparatus of claim 56, wherein said software module for collecting event data from said wireless device collects said event data from a microbrowser on the wireless device.

59. A method for use with a wireless device and at least one receiving center that can receive data collected from data gathering software installed on said wireless device, the method comprising:
   collecting device parametric data of a wireless device;
   collecting network parametric data from said wireless device;
   collecting event data from said wireless device; and
   providing said device parametric data, network parametric data, and event data via a wireless communication network to a control center for processing, wherein the device parametric data, network parametric data, and event data are based on user activity of the wireless device.

60. The method of claim 59, further comprising the step of storing said device parametric data, network parametric data, and event data in a memory of said wireless device.

61. The method of claim 59, further comprising the step of processing said device parametric data, network parametric data and event data to produce products relating to usage and activity, network performance and device performance.

62. The method of claim 59 wherein said step of providing said device parametric data, network parametric data, and event data via a wireless communication network to a control center for processing occurs real time as data is collected.

63. The method of claim 59 wherein said step of collecting event data comprises collecting data pertaining to user-based activities real-time.

64. The method of claim 61, wherein said products integrate usage and activity, network performance and device performance products with location and time stamp data.

65. The method of claim 59 further comprising deploying a plurality of said wireless devices to a panel of users using a statistical sampling methodology to represent a larger universe of wireless communications services users spread across different geographic locations, including users representing at home, at work, domestic and international households.

66. The method of claim 59 wherein said wireless device has a local processor and memory locations to log and store said collected data related to user-based activities whereby data collected via said data gathering software passes through said local processor within said wireless device and is stored in memory on said wireless device.

67. The method of claim 59 further comprising filtering extraneous messaging collected as a result of internal and/or external communications activity from said wireless device to conserve memory resources and to reduce processing time whereby discarded items include messaging unrelated to said device parametric data, network parametric data and event data to be tracked and repetitive or redundant messaging associated with the same operation event within a pre-determined time period.

68. The method of claim 59, further comprising processing said device parametric data, network parametric data, and event data.

69. The method of claim 59 further comprising the step of installing said data gathering software on a processor of said wireless device.

70. The method of claim 59 further comprising the step of installing said data gathering software on a microbrowser on said wireless device.

71. The method of claim 59 further comprising the step of installing said data gathering software on an operating system of said wireless device.

72. The method of claim 59 further comprising the step of installing said data gathering software on said wireless device at the time of wireless device manufacture.

73. The method of claim 59 whereby said data gathering software interfaces with a microbrowser on said wireless device.

74. The method of claim 59 whereby said data gathering software may be differentiated according to N standards, where N is an integer greater than one and equal to the number of wireless communication network protocols from which data is being gathered.

75. The method of claim 59 whereby said data gathering software captures data as it relates to wireless voice communications activity.

76. The method of claim 59 whereby said data gathering software captures data as it relates to wireless data/internet communications activity.

77. The method of claim 59, whereby said data gathering software captures said wireless data/internet communications activity that is both user driven and control center driven.

78. The method of claim 59, whereby said step of providing said device parametric data, network parametric date, and event data via a wireless communication network to a control center for processing further comprises transmitting said device parametric data, network parametric date, and event data to an intermediary server prior to routing to said control center for processing.

79. The method of claim 59 whereby said data gathering software may capture time and location-specific information related to user activity, which may be based on GPS, cell site location or overhead messaging information.

80. A method for use with a wireless device and at least one receiving center that can receive data collected from data gathering software installed on said wireless device, the method comprising;
   collecting device parametric data of a wireless device;
   collecting network parametric data from said wireless device;
   collecting event data from said wireless device;
   providing said device parametric data, network parametric data, and event data via a wireless communication network to a control center for processing; and
   processing said device parametric data, network parametric data, and event data, wherein said step of processing said device parametric data, network parametric data, and event data;
   sorting through collected data to ascertain demographic profiles of wireless device users and related location/market information;
   analyzing usage behavior of said wireless device users;
   analyzing peak/off-peak usage patterns of said wireless device users and average usage days per given period of time;
   analyzing wireless voice metrics;
   analyzing wireless data/internet metrics;
   analyzing functionality of various wireless voice and data/internet services provided to said users;
   analyzing performance metrics related to the wireless device; and analyzing performance metrics related to operators' networks.

81. A system for measuring wireless device and wireless network usage and performance metrics comprising:

a wireless device with a processor and memory;

data gathering software installed on said wireless device for collecting device parametric data;

network parametric data; and event data, wherein the device parametric data, network parametric data, and event data are based on non-testing type activity associated with the wireless device.

82. The system of claim 81, wherein the data gathering software records internal and external communications from said wireless device, where internal communications relate to messaging from operating system or applications within said device and external communications relate to messaging sent or received from said device to or from a communication port, or wireless communication network based on user activity on said wireless device.

83. The system of claim 81, wherein the data gathering software simultaneously captures the device paramedic data, network parametric data, and event data based on real-time user activity of the wireless device.

84. The system of claim 81, wherein the data gathering software is event or environment driven in collecting the device parametric data, network parametric data, and event data.

* * * * *